US006647437B2

(12) United States Patent
Ackerman et al.

(10) Patent No.: US 6,647,437 B2
(45) Date of Patent: Nov. 11, 2003

(54) METHOD FOR AUTOMATICALLY DETECTING AND PROCESSING BINARY POSTSCRIPT PRINT JOBS

(75) Inventors: Erik Nils Ackerman, Lexington, KY (US); Robert Jerome Borchers, Florence, KY (US); Howard Charles Cochran, Lexington, KY (US); Steven Lane Duncan, Lexington, KY (US); David Keith Lane, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 394 days.

(21) Appl. No.: 09/855,283

(22) Filed: May 15, 2001

(65) Prior Publication Data

US 2002/0171856 A1 Nov. 21, 2002

(51) Int. Cl.[7] .......................... G06F 13/20; G06F 13/22
(52) U.S. Cl. ............................... 710/14; 710/8; 710/15; 710/16; 710/18
(58) Field of Search ........................... 710/8, 14, 15, 710/16, 18

(56) References Cited

U.S. PATENT DOCUMENTS

| | | |
|---|---|---|
| 4,954,968 A | 9/1990 | Yamaguchi et al. |
| 5,222,200 A | 6/1993 | Callister et al. |
| 5,438,650 A | 8/1995 | Motoyama et al. |
| 5,555,435 A | 9/1996 | Campbell et al. |
| 5,633,992 A | 5/1997 | Gyllenskog |
| 5,655,152 A | 8/1997 | Ohnishi et al. |
| 5,671,341 A | 9/1997 | Kashiwazaki et al. |
| 5,715,379 A | 2/1998 | Pavlovic et al. |
| 5,754,747 A | 5/1998 | Reilly et al. |
| 5,784,544 A | 7/1998 | Stevens |
| 5,812,873 A * | 9/1998 | Ryu ............................... 710/2 |
| 5,818,603 A | 10/1998 | Motoyama |
| 5,857,064 A | 1/1999 | deSilva |
| 5,913,016 A | 6/1999 | Matsuyama et al. |
| 6,006,281 A | 12/1999 | Edmunds |
| 6,091,508 A * | 7/2000 | Love et al. ................. 358/1.15 |
| 6,092,088 A | 7/2000 | Takeda |
| 6,525,831 B1 * | 2/2003 | Evans, IV ................... 358/1.15 |

OTHER PUBLICATIONS

Adobe Systems Incorporated, "Adobe Serial and Parallel Comminications Protocols Specification," Nov. 20, 1992, Adobe Developer Technologies.
IBM Technical Disclosure Bulletin, "Automatic Determination of Binary Print Data Stream," Sep., 1989, pp. 123–124.
IBM Technical Disclosure Bulletin, "Printer Data Stream Method to Allow Dynamic Stream Switching," Jun., 1990, pp. 126–130.
IBM Technical Disclosure Bulletin, "Using Device Names to Dynamically Switch Printer Data Streams," Jun., 1990, pp. 150–152.

* cited by examiner

Primary Examiner—Rehana Perveen
(74) Attorney, Agent, or Firm—Frederick H. Gribbell; John A. Brady

(57) ABSTRACT

A printer is provided which has a special Emulation Manager function as well as a "code sniffer" function, in which print data received is sent to a code sniffer buffer. A code sniffer function automatically determines the type of emulator that should be called to perform the interpretation or rendering of this print job, and if the code sniffer determines that the correct emulator is PostScript, then the code sniffer scans the data for any "special tokens." If a special token is found, the PostScript emulator determines if the special token string data is part of a PostScript comment. If it is in the correct format, then the PostScript emulator sets the "mode flag" to the "MacBinary" state, and the code sniffer ceases any further filtering of control characters and disables any change of emulator command that may be received during this print job. The rest of the print job is then interpreted as RAW binary data by the PostScript emulator, until a "UEL" string is encountered.

23 Claims, 3 Drawing Sheets

METHOD FOR AUTOMATICALLY DETECTING AND PROCESSING BINARY POSTSCRIPT PRINT JOBS

TECHNICAL FIELD

The present invention relates generally to image forming equipment and is particularly directed to printers of the type which receive raw binary data as print jobs. The invention is specifically disclosed as a printer that can automatically determine when a raw binary data print job is received from an Apple Computer or other host device.

BACKGROUND OF THE INVENTION

The PostScript language can be communicated to a printer using a variety of protocols. In 1992, Adobe defined three such protocols for parallel and serial communication channels, as follows:

Adobe Standard Protocol (ASP),

Binary Communications Protocol (BCP), and

Tagged Binary Communications Protocol (TBCP).

The Adobe specification that describes these protocols indicates that they contain control sequences that should not be embedded in PostScript documents sent via communication channels other than serial or parallel. The following is a quote from the Adobe specification:

The protocols described here are link-level protocols that are specific to serial and parallel communications channels. The protocols define special character sequences to indicate special control functions that are not logically part of the data stream.

Other communications channels provide such functions in entirely different ways, such as with special packet types in a local area network (LAN). When communicating via such channels or when saving a PostScript language program to a file, it is never appropriate to embed any of the control sequences described in this document.

A further protocol is also used to communicate the PostScript language and is referred to as "raw binary data," which will be referred to below as "RAW." This fourth protocol requires control sequences to be performed using the features available in the communications channel, such as the special packet types noted above. The RAW protocol allows any character or character sequence to be sent to a printer and interpreted as print data, rather than as a special control sequence. For example, the hex 14 character would be interpreted in the ASP protocol as a Job Status Request, but in the RAW protocol it would merely refer to data to be printed having that value of 14 hexadecimal.

All of the above protocols could properly be handled by a printer if the protocol being used in the data stream is easily and accurately detectable by the printer. Unfortunately, the control sequences in the ASP, BCP, and TBCP protocols can be the same numeric information as graphic, fonts, images, or other data in the RAW protocol, and the printer could incorrectly process the print job if it does not determine the correct protocol being used by the host or source.

Print drivers under different operating systems for host computers use different protocols when creating the PostScript data stream. The majority of the host operating systems use the ASP, BCP, or TBCP protocols, since the use of these protocols allows the printer to easily and accurately detect the protocol being used. However, one significant operating system does not use ASP, BCP, or TBCP, which is the operating system running on computers manufactured by Apple Computer Company. The APPLE® operating systems can use some of these protocols, but typically use the RAW protocol. This creates a problem for printers, since mixing RAW protocol print jobs and non-RAW print jobs often results in incorrect print output.

In the past, APPLE® computers mostly used AppleTalk™ and EtherTalk™ communication channels to communicate to printers. Since these channels are unique to APPLE® computers, network adapters manufactured by Lexmark International, Inc. handle PostScript jobs by converting all AppleTalk and EtherTalk jobs to the TBCP protocol. LEXMARK® printers with on-board AppleTalk or EtherTalk handle PostScript jobs by setting the printer's data stream scanner to handle PostScript jobs using the RAW protocol. These conversions and configuration changes were handled automatically by the printer, without user intervention.

APPLE® computers also use the USB and Direct IP™ communication channels. Since these communication channels are not unique to APPLE® brand computers, printers can no longer perform the conversion or configuration changes with certainty, whereas in the past they were automatically performed with no problems. The printer could not automatically make a conversion or configuration change for USB and Direct IP communication channels, because PostScript print jobs from other operating systems could become unprintable.

Lexmark currently produces printers with USB ports, and some customers with APPLE® computers print binary PostScript jobs that use the RAW protocol. In such situations, Lexmark supplies the customer with a PostScript file that is manually sent to the printer by the customer which changes the USB communications channel configuration to process PostScript jobs using the RAW protocol. This allows the APPLE® operating system to work, but prevents the printer from printing certain print jobs from other operating systems using the same USB port. Apple customers can also configure their operating system to convert the binary data to ASCII within the PostScript print job, but some applications do not honor this setting and will continue to send the print job containing binary data, which results in a failed print job.

To solve the problem with Direct IP printing, Lexmark currently recommends the same manual configuration change used on a USB port, which allows the APPLE® computer to print through the IP network connection, but will cause some print jobs from non-Apple computers on the same network to fail to print on that printer. Configuring the non-Apple computers on the network to convert the binary data to ASCII would resolve the problems, but not all computers or applications support converting a print job to ASCII. This lack of full support for ASCII mode printing results in the ASCII mode being an unacceptable solution.

Hewlett-Packard also ships printers with an available USB communications channel. The Hewlett-Packard solution for the binary data problem is for the customer to set their printer driver to use the ASCII protocol. However, Hewlett-Packard indicates that there could be a problem when attempting to print binary encoded data. Printing RAW binary data with the Direct IP communications channel is accomplished by having the user reconfigure the print driver of their operating system to select a special BINPS print queue in their network printer servers.

It would be an improvement to provide a printer that could automatically detect a print job under the RAW protocol that will also allow print jobs using the RAW protocol to be intermixed with print jobs using other protocols, while allowing all jobs to print correctly.

SUMMARY OF THE INVENTION

Accordingly, it is an advantage of the present invention to provide a print data detection system that automatically determines when a RAW protocol print job is being sent to a printer, while also automatically determining when other protocols are used for print jobs sent either by different host computers, or with different protocols, in which all print jobs will print correctly.

It is another advantage of the present invention to provide a printer that automatically detects when a RAW protocol print job is being received, and will also operate successfully with other print job protocols, through the use of an Emulation Manager as well as a Print Language Interpreter.

It is a further advantage of the present invention to provide a printer that can automatically detect the use of a binary PostScript print job sent by an APPLE® computer operating system that provides the user with the ability to print correctly without performing additional configuration steps that would otherwise be required to allow the computer and printer to operate using the same protocol.

It is still another advantage of the present invention to provide a printer that can automatically detect a print job that uses the binary PostScript protocol, sent by either an APPLE® computer or a non-Apple computer, and also has the ability to print from both APPLE® and non-Apple computers through IP printing without the need for special print queues or print servers.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for automatically detecting and processing binary print data is provided, comprising the following steps: providing an image forming apparatus having a memory circuit for storage of data, a communications port, and a processing circuit, the memory circuit containing at least one computer program that includes a code sniffer function and an emulator function; scanning, by use of the code sniffer function, incoming data received at the communications port to determine if a predetermined special token has been received in a print job; and if the predetermined special token has been received, the code sniffer function changes a mode of operation so that it will treat all further incoming data for this print job as RAW binary data.

In accordance with another aspect of the present invention, a method for automatically detecting and processing binary print data is provided, comprising the following steps: providing an image forming apparatus having a memory circuit for storage of data, a communications port, and a processing circuit, the memory circuit containing an input buffer, a code sniffer buffer, an emulator working memory area, and at least one computer program that includes a code sniffer function and an emulator function; the input buffer receiving input data from the communications port and sending at least one portion of the input data to the code sniffer buffer, scanning, at the beginning of a print job, the portion of incoming data in the code sniffer buffer to determine the type of emulator that corresponds to the print job input data, and to determine if a predetermined data pattern has been received in a print job; if at least one predetermined data pattern is found, the code sniffer function temporarily ceases to pass any further data to the emulator working area until the emulator function determines whether the predetermined data pattern comprises a predetermined special token; and if the predetermined special token has been received, the code sniffer function changing a mode of operation so that it will treat all further incoming data for this print job as RAW binary data.

In accordance with a further aspect of the present invention, an image forming apparatus is provided, which comprises: a memory circuit for storage of data, and containing at least one computer program that includes a code sniffer function and an emulator function; a communications port that is effectively connected to at least one external device and to the memory circuit, the communications port providing data from the at least one external device to the memory circuit, and a processing circuit which is configured to scan by use of the code sniffer function, incoming data received at the communications port to determine if a predetermined special token has been received in a print job, and if the predetermined special token has been received, the processing circuit is further configured to change a mode of operation so as to require the code sniffer function to treat all further incoming data for this print job as RAW binary data.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
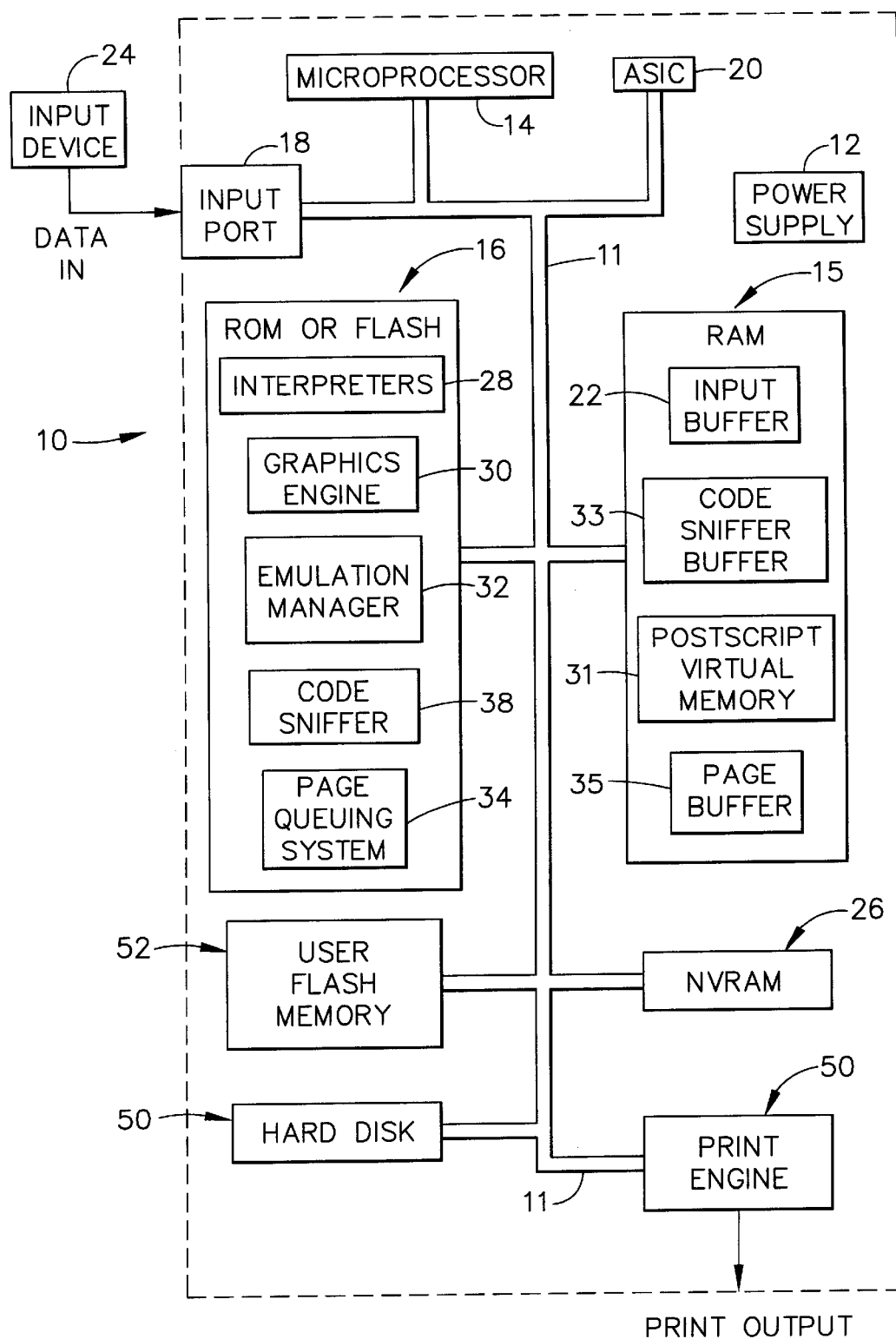
FIG. 1 is a block diagram of some of the important components used in a printer that operates according to the principles of the present invention.

Reference will now be made in detail to the present preferred embodiment of the invention, an example of which is illustrated in the accompanying drawings, wherein like numerals indicate the same elements throughout the views.

A printer is provided which has a special Emulation Manager function as well as a "code sniffer" function, in which print data is received at an input port, sent to an input buffer in RAM, and the received data in the input buffer is sent in predetermined size "chunks" to a code sniffer buffer that also resides in RAM. When incoming data is available in the code sniffer buffer, the code sniffer function automatically determines the type of emulator that should be called to perform the interpretation or rendering of this print job. If the code sniffer determines that the correct emulator is PostScript, then the code sniffer scans the data for any "special tokens." If a special token is found, the code sniffer stops passing data to the interpreter, so that the PostScript emulator/interpreter can inspect the data in more detail. It will be understood that the term "emulator" has the meaning of an interpreter or a rendering function, and also can be referred to as a "printer language emulator," for example, or merely a "printer emulator."

The PostScript emulator determines if the special token string data is part of a PostScript comment. If it is in the correct format, then the PostScript emulator sets the "mode flag" to the "MacBinary" state. When this occurs, the code sniffer function ceases any further filtering of control characters, and also disables any change of emulator command that may be received during this print job. The rest of the print job is then interpreted or rendered as RAW binary data by the PostScript emulator, until a "UEL" string is encountered, or the data link device reports an End-of-File condition, such as when a TCP network connection closes or a timeout has expired on a parallel port. At that time, it is determined that the print job has terminated.

If no special token was found in the print data by the PostScript emulator, then further data is sent from the code sniffer buffer to the PostScript emulator until reaching the end of the buffer (i.e., the buffer is emptied), at which time the print job is continued using the PostScript emulator. However, the filters of the code sniffer operate as normal, per the Adobe "ASP" specification.

Since standard PostScript emulators/interpreters ignore PostScript comments that are embedded in a print job, it requires a customized PostScript emulator to perform the tasks of the present invention. If the correct "special token" is found as part of a PostScript comment, then the mode flag is set to MacBinary, as noted above. When this occurs, the printer treats all data as if it were RAW data, which means that any binary numbers that would otherwise be treated as a control character are instead treated as actual print data having that binary numeric value, without any special coded message or character as a preface.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) or Flash memory 16, and Random Access Memory (RAM) 15, which is divided by software operations into several portions for performing several different functions.

Laser printer 10 also contains at least one input port, or in many cases several types of input ports, as designated by the reference numeral 18. Each of these ports would typically be connected to a corresponding input buffer, generally designated by the reference numeral 22 on FIG. 1. Each port 18 would typically be connected to an output port of either a personal computer (PC) or a workstation (WS) (designated on FIG. 1 as an "input device" 24) that would contain a software application program such as a word processor, or a graphics package or computer aided drawing package, or connected to a network that could be accessed by such a PC or WS. Laser printer 10 preferably will also contain an Application Specific Integrated Circuit (ASIC) 20, which typically contains a large number of programmable logic circuits.

Once text or graphical data (i.e., print data) has been received by input buffer 22, it is commonly communicated to one or more interpreters designated by the reference numeral 28. A common interpreter is PostScript™, which is an industry standard used by many laser printers. After being interpreted, the input data is typically sent to a common graphics engine to be rasterized, which typically occurs in a portion of RAM designated by the reference numeral 30 on FIG. 1.

Once the data has been rasterized, it is directed by a page queuing system 34 into a page buffer, which is a portion of RAM designated by the reference numeral 35. In a typical laser printer, an entire page of rasterized data is temporarily stored by the page queuing system 34 in the page buffer 35, although some of the more modern laser printers do not buffer an entire page's worth of data at one time, thereby managing to operate with a much smaller amount of RAM in a "partial page buffer." The data within the page buffer 35 is communicated in real time to a print engine designated by the reference numeral 36. Print engine 36 includes a laser light source within its printhead (not shown), and its output 40 is the physical placement of toner onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM/Flash and RAM integrated circuits, and the control lines or interrupt lines are typically directed to all input or output integrated circuits that act as buffers. For ease of illustrating the present invention, the various busses used within printer 10 are grouped on FIG. 1 into a single bus pathway, designated by the reference numeral 11.

A portion of the RAM 15 is typically allocated for virtual memory for at least one interpreter, and on FIG. 1 a PostScript virtual memory is depicted at the reference numeral 31. This virtual memory 31 can, for example, be used for storing PostScript font descriptors within the printer. In addition, particularly important information that is to be retained in printer 10 while unpowered can be stored in a quickly accessible non-volatile memory location called "NVRAM," which is designated by the reference numeral 26. This non-volatile RAM is most likely (using today's technology) an EEPROM integrated circuit chip. On some laser printers, a hard disk drive 50 and a User Flash memory 52 are also provided.

More specific to the present invention, an Emulation Manager function 32 and a "code sniffer" function 38 are provided as part of a computer program that resides in ROM or Flash memory 16 of the laser printer 10. Moreover, a "code sniffer buffer" 33 is provided in RAM. The specific functions of these elements are described in greater detail below. In general, the code sniffer buffer 33 receives "chunks" or packets of data from the input buffer 22 that is actively receiving a print job from one of the input ports 18, and the code sniffer function 38 (also referred to herein as the "code sniffer 38") analyzes the data that is placed into the code sniffer buffer 33. The Emulation Manager function 32 (also referred to herein as the "Emulation Manager 32") controls many operations of the printer 10, including when and how the code sniffer and interpreters 28 operate with one another.

It will be understood that the PostScript interpreter at 28 on FIG. 1 is a modified or customized PostScript interpreter, for use with the present invention. As noted above, standard PostScript interpreters ignore PostScript comments that are embedded in a print job sent by a host computer, such as the input device 24. In the present invention, the code sniffer buffer 33 contains up to 4K bytes of information that has been sent by the host computer. Most print jobs are larger than 4K, and so at the onset the code sniffer buffer will only contain the initial 4K bytes of the print job. When the code sniffer buffer starts to send data to the interpreter (or PostScript emulator) 28, this modified PostScript emulator will inspect the PostScript comments instead of ignoring them. As will be described below, the code sniffer function 38 is also a "special" code sniffer as compared to those available in the past.

The code sniffer of the present invention now has the additional task of seeking a "special token" that will indicate that a RAW binary data print job is being received through the code sniffer buffer. It is important that the code sniffer function 38 itself make this determination, rather than depending upon the PostScript interpreter 28, because if it turns out that this is a RAW binary data print job, then the very next byte must be treated as RAW binary data, even though it may have the hexadecimal numeric value of a standard escape code, and would be treated as such by a standard PostScript emulator. It cannot be allowed to have this "next" byte of data sent to the PostScript emulator until after the mode flag has been changed. This will be discussed in greater detail below.

Figure 2A:
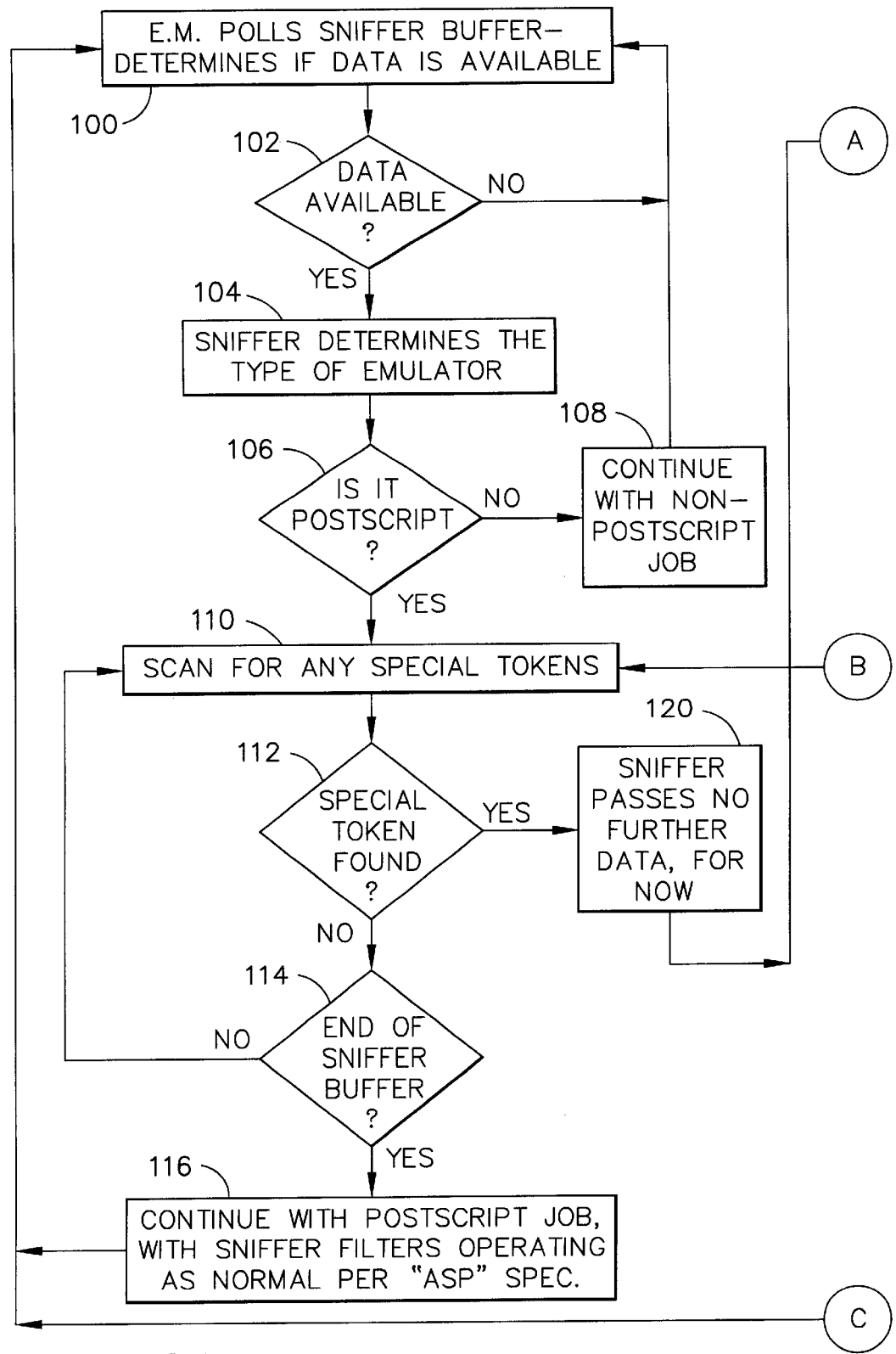
FIG. 2 (the combination of FIGS. 2A and 2B) is a flow chart of the important operational steps involved in operating the printer of FIG. 1, as according to the principles of the present invention.
Figure 2B:
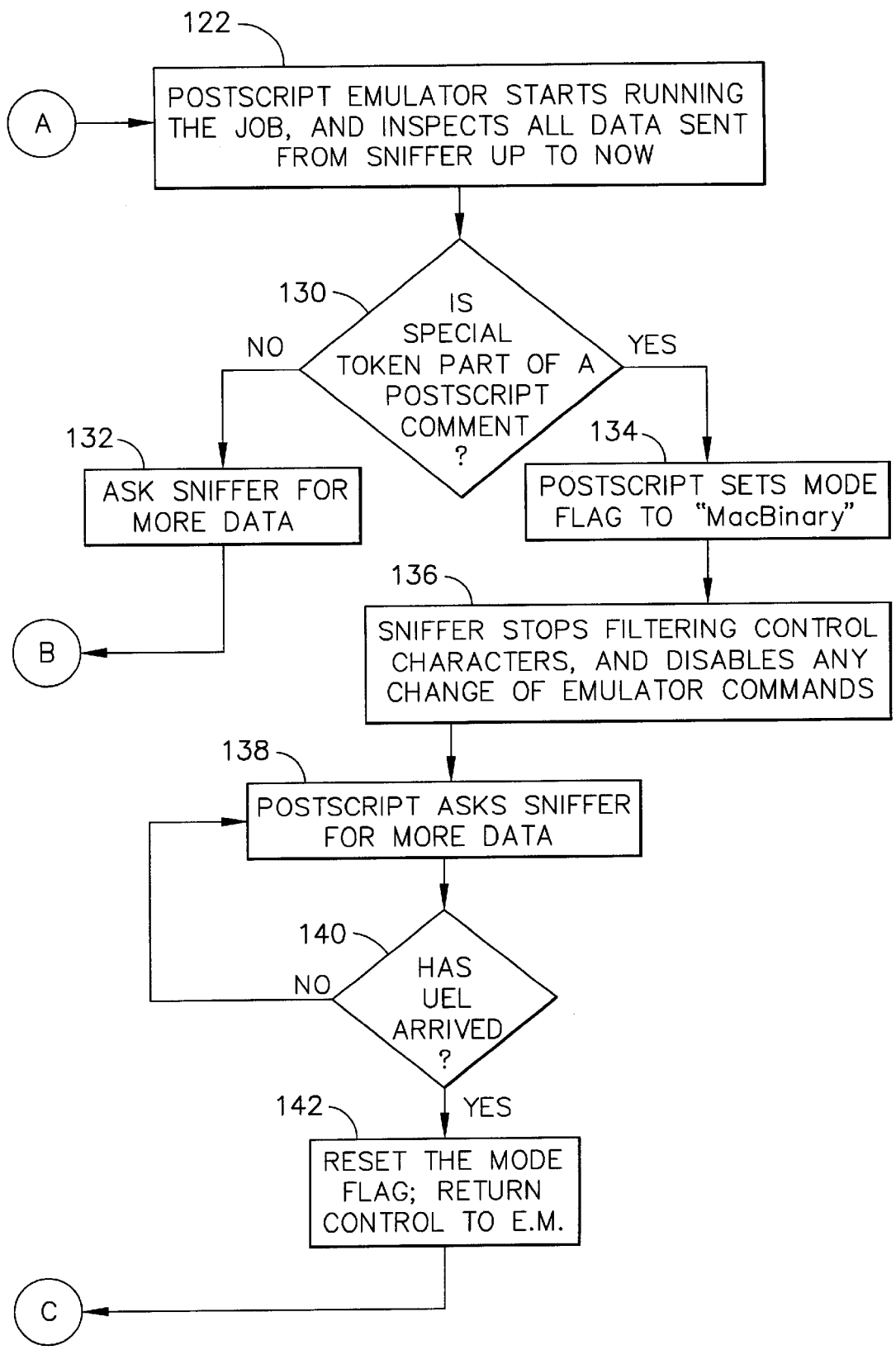

Referring now to FIG. 2 (see FIG. 2A), at a step 100 the Emulation Manager 32 polls the code sniffer buffer 33 to determine if any data is available. A decision step 102 makes the actual determination, and if data is not available, the logic flow returns back to step 100 until the next time the Emulation Manager again polls the sniffer buffer 33.

If data is available, decision step 102 directs the logic flow to a step 104 where the code sniffer 38 determines what type of emulator is being specified by the print data of the received print job. At this point, the code sniffer buffer 33 should contain the first 4K bytes of print data for the current print job. This initial portion of the print job should contain any "special token" that will be sent along with the print job, or more correctly as part of the print job. Moreover, the first 4K bytes of data for the print job should also be sufficient for the code sniffer to determine what type of emulator is being specified by the print job. In most circumstances, the code sniffer 38 can determine the type of emulator before the occurrence of any special token within the print job information. On the other hand, if the special token is embedded in the print job before the code sniffer function 38 can determine the type of emulator, then it is possible for the software running the printer to play back the entire initial 4K of data stored in the code sniffer buffer 33, if necessary to find any special token. Generally speaking, the special token will be found in the print data after the determination of the type of emulator.

A step 106 determines whether or not the type of emulator is PostScript, and if it is not, then the logic flow is directed to a step 108 where the printer continues with a non-PostScript job. After that has been completed, the logic flow for the purposes of the present invention is directed back to step 100 where the Emulation Manager continues to poll the sniffer buffer.

If the print job is a PostScript job, then the logic flow is directed to a step 110 where the data is scanned by the sniffer for any "special tokens." Such special tokens can be embedded in the print data as a matter of course by certain operating systems, or such special tokens can be intentionally inserted into the print data by a printer driver, or a printer's PPD file that is residing on the host computer.

Examples of special tokens that could work with the present invention are as follows:
 (1) %*Copyright:*Apple*\n
 (2) %*Lexmark*PPD*File*\n
 (3) %*Lexmark Raw Data*\n Naturally, other character strings could also be utilized as special tokens, but of course, the printer must be informed of those character strings that are to be utilized as special tokens, and therefore be expecting them. It will be understood that in the above examples, the percent sign (%) represents the first character of a PostScript comment; that the asterisk (*) represents any character(s) other than a carriage return (<CR>) or line feed (<LF>), and that the string "\n" represents a new line character, such as the carriage return (<CR>) which is ASCII 13 in decimal, or the character for a line feed (<LF>) which is the ASCII character 10 in decimal.

It will be further understood that the "special token" can consist of any predetermined character string, as per the printer designer's wishes. Of course, one would desire the special token to be definitive of a RAW data print job, but that can be accomplished in more than one way, as discussed above.

After scanning for special tokens at step 110, a decision step 112 determines if a special token has been found. If not, a decision step 114 determines if the end of the sniffer buffer has been arrived at. If not, the logic flow is directed back to step 110, which scans for any special tokens within the next portion of data that is received from the sniffer buffer. On the other hand, if step 114 determines that the end of the sniffer buffer has been arrived at, then a step 116 will continue with the PostScript job, in which case the sniffer filters will operate as normal, per the Adobe "ASP" specification.

If step 112 actually found one of the special tokens, then the logic flow is directed to a step 120 that halts the sniffer temporarily, so that the code sniffer function 38 passes no further data from the code sniffer buffer 33 for the time being. If the special token is "real," then it is important to not proceed in transferring any further data bytes from the sniffer buffer 33 to the interpreter until after a mode flag has been set. This determination will be discussed now.

A step 122 now has the PostScript emulator starting to interpret the print job. At this step 122, all data sent from the sniffer buffer 33 up to this point is inspected. A decision step 130 now determines if the special token was part of a PostScript comment. If the answer is NO, then a step 132 asks the code sniffer 38 to send more data from the code sniffer buffer 33. It is quite possible that a special token may exist further on in the data currently residing in the sniffer buffer 33.

If decision step 130 determines that the special token was part of a PostScript comment, then a step 134 has the PostScript emulator set the mode flag to "MacBinary." This means that the print job contains RAW data, and all escape codes and other special control function characters should be ignored. It also means that the data is most likely being sent by an APPLE® computer, or some other similar computer running an APPLE® operating system. Of course, it could be any other type of host computer that wishes to send data in the RAW format, in which case he special token would likely not be the first token described above, which was "%*Copyright:*Apple*\n".

Once the mode flag has been set to MacBinary, a step 136 causes the code sniffer 38 to stop filtering control characters. Furthermore, the step 136 also disables any change of emulator commands that might be received as part of this print job. It would not be proper to allow the emulator to be changed to something other than PostScript at this time, since it has been already determined that the print job consists of RAW data.

The PostScript emulator now asks the code sniffer for more data at a step 138. This step is required since the code sniffer buffer only contains 4K bytes of data in the preferred embodiment (however, this buffer could of course be of any size, such as 8K or 12K). Obviously, most print jobs contain much more than 4K of data, and the code sniffer buffer 33 will be filled multiple times with data from the single print job as it is received in the input buffer 22. This will continue until the end of the print job is encountered. This determination occurs at a decision step 140, which determines if a Universal Exit Language character string has been found. This is also referred to as a "UEL" command, which is a string of characters as follows: "<ESC>%-12345X". If not, then the logic continues to have the PostScript emulator ask the code sniffer for more data at step 138. If so (i.e., a UEL is found), a step 142 resets the mode flag to its default value, and returns control to the Emulation Manager. Decision step 140 will also arrive at a YES result if the data link device reports an End-of-File condition, such as when a TCP network connection closes or a timeout has expired on a parallel port. The logic flow is now directed back to step 100.

It will be understood that the present invention will probably be most useful when a printer is mated to an APPLE® computer. In such a situation, it can be typically assumed that the first token described above will be contained in the initial portions of any print job passed down from the APPLE® computer, due to the way its operating system formats print jobs. On the other hand, the invention can be used with other types of operating systems, and the data format can still be set to RAW by using a different predetermined special token in the initial data of the print job.

It will also be understood that in typical APPLE® computers using the Macintosh operating system, the printer driver is typically provided by the operating system itself, rather than by the manufacturer of the printer. The APPLE® operating system also provides a "PPD" file as the default, although most printer manufacturers also will provide a "PPD" file for use with APPLE® computers. If the user specifies the PPD file provided by the printer manufacturer, then the opportunity exists for a special token to be inserted by the printer manufacturer's software in the PPD file. In this instance, the special token could be either a PostScript command or part of a PostScript comment, for example. It will further be understood that the PPD file is a printer driver configuration file, but is not the actual printer driver itself.

It will be yet further understood that the principles of the present invention could be used with other emulators than PostScript. For example, a special token could be provided for PCL or PDF files that wish to communicate print data in the RAW format. When using one of these other emulators, for example, the special token could be either a command or part of a comment.

In situations where the printer driver is provided by the printer manufacturer or by an application developer (e.g., Adobe), a special token could be inserted in the datastream as a command, for example, that would inform the printer that this particular print job is a RAW binary print job.

When used with a Lexmark-manufactured printer, the present invention can be described in greater detail, which now follows. The Emulation Manager is responsible for scanning data received from a communications channel while looking for job control information (e.g., PJL), print language interpreter information (e.g., PostScript, PCL, or PPDS, etc.), control sequences, end of job indicators, and print data. The print language interpreter (e.g., interpreter 28) typically is responsible for generating a printable image based upon the print language-specific print data that is received from the Emulation Manager 32.

Prior to the present invention, the Emulation Manager 32 of a LEXMARK® printer was set up either to only handle the RAW protocol, or to handle all protocols other than RAW. This configuration has been controlled by a printer setting called "Filtering," which referred to the communications channel. If Filtering was turned OFF, the Emulation Manager was operated in the RAW protocol mode. The Emulation Manager scanned for job control information, print language information, and end of job indicators. Any data received on the communication channel that was not job control information, print language information, or an end of job indicator was considered print data and passed to the print language interpreter for processing.

If Filtering was ON, the Emulation Manager was operating in a mode that supported ASP, TBCP, BCP, ASCII, and other protocols. Job control information, control sequences, and end of job indicators were processed by the Emulation Manager. The Emulation Manager also passed the remaining print data to the interpreter for processing.

By using the present invention, the Filtering setting can also be placed into an "Automatic" mode, which defines a method for the Emulation Manager and interpreter to detect that the RAW protocol is being used, as described above. Moreover, the present invention allows the Emulation Manager and the interpreter to interact to ensure that the print jobs are properly processed when the Filtering setting is placed into Automatic.

While the Emulation Manager 32 is scanning the received data, it is looking for job control information, print language information, control sequences, and end of job indicators. Moreover, it scans for a RAW protocol indicator (e.g., the "special token"), as according to the present invention described above. This indicator can be implemented by different binary data strings or sequences, such as a job control information command that specifies the protocol is RAW (e.g., a PJL command indicating that data for the print job is sent using the RAW protocol), or a series of characters in the data that can be recognized as coming from an operating system that provides print data using the RAW protocol (such as an APPLE® computer).

If the print data is being sent by an APPLE® computer, it is expected that the token first described above that contains the words "Copyright" and "Apple" in a PostScript comment will be included in the print data. The code sniffer 38 and the interpreter 28 are designed to detect such a special token, as described above. The interpreter processes the new command so as to change modes during normal print data processing, and remembers that the command has been executed for the current print job and will report this information to the Emulation Manager when requested. The command can also be added to a PPD file used by the APPLE® operating system, as described above. The command in the PPD file can be sent as part of the print job initialization.

When the Filtering is set to Auto, the Emulation Manager starts processing data received from the communications channel as if the FILTERING attribute was set to ON. As job control information, print language information, control sequences, print data, and end of job indicators are being scanned for, the RAW protocol indicator described above is also being scanned for. Since the primary problem with supporting the RAW protocol and other protocols at the same time is caused by the handling of control sequences, the Emulation Manager scans and processes the received data until a control sequence is recognized. If the Emulation Manager has detected a RAW protocol indicator (i.e., the special token), it continues processing the remainder of the job as if the FILTERING attribute was set to OFF.

If the Emulation Manager has not detected the RAW protocol indicator (i.e., the special token), it stops scanning the received data and passes the previously scanned data to the interpreter 28 for processing. It should be noted that the Emulation Manager may limit the quantity of data that it scans to a predetermined amount or threshold. Limiting the data scanned can improve performance by reducing the time used to scan data, and allowing more time to process the data.

Once the interpreter processes all previously scanned data, the Emulation Manager and interpreter perform a handshake to determine if the data processed by the interpreter contains the print language specific command that enables the RAW protocol support. If the interpreter has recognized the RAW protocol enabling command (i.e., the special token), the Emulation Manager and interpreter continue processing the remainder of the print job as if the Filtering attribute has been set to OFF. The control sequence that caused the Emulation Manager to stop scanning is processed as "print data" instead of as a control sequence.

If the interpreter 28 has not recognized the RAW protocol enabling command (i.e., the special token), the Emulation Manager 32 processes the control sequence as a "control sequence" (instead of binary data) and resumes scanning the data for job control information, printer language information, print data, end of job indicators, and RAW protocol indicators. When the next control sequence is found, the process is repeated until the next print job is found, or until the RAW protocol is enabled for the current job. Once the current print job ends, the Emulation Manager 32 and printer language interpreter 28 restart their scanning for the RAW protocol indicator, or a RAW protocol enabling command, for the next print job.

It will be understood that the logical operations described in relation to the flow chart of FIG. 2 can be implemented using sequential logic, such as by using microprocessor technology, or using a logic state machine, or perhaps by discrete logic; it even could be implemented using parallel processors. The preferred embodiment uses a microprocessor (e.g., microprocessor 14) to execute software instructions that are stored in memory cells within RAM or ROM/Flash memory. In some configurations, a microprocessor that performs some of the printer's functions is contained within an ASIC, such as the ASIC 20. Of course, other circuitry could be used to implement these logical operations depicted in FIG. 2 without departing from the principles of the present invention.

It will be further understood that the precise logical operations depicted in the flow chart of FIG. 2, and discussed above, could be somewhat modified to perform similar, although not exact, functions without departing from the principles of the present invention. The exact nature of some of the decision steps and other commands in this flow chart are directed toward specific models of printer systems (those using Lexmark printers, for example) and certainly similar, but somewhat different, steps would be taken for use with other types of printing systems (e.g., ink jet printers or LED printers) in many instances, with the overall inventive results being the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for automatically detecting and processing binary print data, said method comprising:

(a) providing an image forming apparatus having a memory circuit for storage of data, a communications port, and a processing circuit, said memory circuit containing at least one computer program that includes a code sniffer function and an emulator function;

(b) scanning, by use of said code sniffer function, incoming data received at said communications port to determine if a predetermined special token has been received in a print job; and (c) if said predetermined special token has been received, said code sniffer function changing a mode of operation so that it will treat all further incoming data for this print job as RAW binary data.

2. The method as recited in claim 1, wherein said memory circuit contains an input buffer, a code sniffer buffer, and an emulator working memory area;

said input buffer receiving input data from said communications port and sending at least one portion of said input data to said code sniffer buffer as needed;

at the beginning of a print job, said code sniffer buffer receiving an initial portion of said input data from said input buffer and scanning said initial portion;

during the scan of said initial portion of input data, said code sniffer function determining the type of emulator that corresponds to said print job input data;

if said emulator type is PostScript, said code sniffer function scanning for said predetermined special token, and if at least one predetermined data pattern is found, said code sniffer function temporarily ceases to pass any further data to said emulator working area until said emulator function determines whether said special token is within a PostScript comment; and if said emulator function determines that said at least one predetermined data pattern is contained within a PostScript comment, then said code sniffer function concludes that said predetermined special token has been found and changes said mode of operation by setting a mode flag.

3. The method as recited in claim 2, further comprising: after the mode flag is set, said code sniffer function stops filtering control characters in the input data, and disables any change of emulator commands in the input data.

4. The method as recited in claim 2, further comprising: after the mode flag is set, said code sniffer function treats all of the input data as RAW binary data, except for a Universal Exit Language character string.

5. The method as recited in claim 4, further comprising: after the Universal Exit Language character string has arrived in the input data, said mode of operation is reset to non-RAW binary data.

6. The method as recited in claim 2, wherein said predetermined special token comprises one of: (a) a series of binary numbers residing in a printer driver program on a host computer, (b) a series of binary numbers residing in a PPD file on a host computer, or (c) a series of binary numbers that are embedded in the print data of the print job itself.

7. The method as recited in claim 6, wherein said series of binary numbers residing in a printer driver program on a host computer comprises alphanumeric characters having a format of either:

%*Lexmark*PPD*File*\n, or

%*Lexmark Raw Data*\n.

8. The method as recited in claim 6, wherein said series of binary numbers residing in a PPD file on a host computer comprises alphanumeric characters having a format of either:

%*Lexmark*PPD*File*\n, or

%*Lexmark Raw Data*\n.

9. The method as recited in claim 6, wherein said series of binary numbers that are embedded in the print data of the print job itself comprises alphanumeric characters having a format of:

%*Copyright:*Apple*\n.

10. The method as recited in claim 1, wherein said predetermined special token comprises one of: (a) a series of binary numbers residing in a printer driver program on a host computer, (b) a series of binary numbers residing in a PPD file on a host computer, or (c) a series of binary numbers that are embedded in the print data of the print job itself; and wherein said predetermined special token is transmitted to said image forming apparatus as either a PostScript command or in a PostScript comment.

11. An image forming apparatus, comprising:

a memory circuit for storage of data, and containing at least one computer program that includes a code sniffer function and an emulator function;

a communications port that is effectively connected to at least one external device and to said memory circuit, said communications port providing data from said at least one external device to said memory circuit, and a processing circuit which is configured to scan by use of said code sniffer function, incoming data received at said communications port to determine if a predetermined special token has been received in a print job, and if said predetermined special token has been received, said processing circuit is further configured to change a mode of operation so as to require said code sniffer function to treat all further incoming data for this print job as RAW binary data.

12. The image forming apparatus as recited in claim 11, wherein said memory circuit contains an input buffer, a code sniffer buffer, and an emulator working memory area;

said processing circuit being further configured to:

send at least one portion of input data received at said input buffer to said code sniffer buffer as needed;

at the beginning of a print job, scan an initial portion of said input data residing in said code sniffer buffer, and during said scan, determine the type of emulator that corresponds to said print job input data;

if said emulator type is PostScript, scan the data in said code sniffer buffer for said predetermined special token, and if at least one predetermined data pattern is found, prevent said code sniffer function from passing any further data to said emulator working area until said emulator function determines whether said special token is within a PostScript comment; and if said emulator function determines that said at least one predetermined data pattern is contained within a PostScript comment, then change said mode of operation by setting a mode flag.

13. The image forming apparatus as recited in claim 12, wherein said processing circuit is yet further configured to, after the mode flag is set:

prevent said code sniffer function from filtering further control characters in the input data, and to disable any change of emulator commands in the input data.

14. The image forming apparatus as recited in claim 12, wherein said processing circuit is yet further configured to, after the mode flag is set: to cause said code sniffer function to treat all of the input data as RAW binary data, except for a Universal Exit Language character string.

15. The image forming apparatus as recited in claim 12, wherein said processing circuit is yet further configured to, after the Universal Exit Language character string has arrived in the input data: to reset said mode of operation to non-RAW binary data.

16. The image forming apparatus as recited in claim 12, wherein said predetermined special token comprises one of: (a) a series of binary numbers residing in a printer driver program on a host computer, (b) a series of binary numbers residing in a PPD file on a host computer, or (c) a series of binary numbers that are embedded in the print data of the print job itself.

17. The image forming apparatus as recited in claim 16, wherein said series of binary numbers residing in a printer driver program on a host computer comprises alphanumeric characters having a format of either:

%*Lexmark*PPD*File*\n, or

%*Lexmark Raw Data*\n.

18. The image forming apparatus as recited in claim 16, wherein said series of binary numbers residing in a PPD file on a host computer comprises alphanumeric characters having a format of either:

%*Lexmark*PPD*File*\n, or

%*Lexmark Raw Data*\n.

19. The image forming apparatus as recited in claim 16, wherein said series of binary numbers that are embedded in the print data of the print job itself comprises alphanumeric characters having a format of:

%*Copyright:*Apple*\n.

20. A method for automatically detecting and processing binary print data, said method comprising:

(a) providing an image forming apparatus having a memory circuit for storage of data, a communications port, and a processing circuit, said memory circuit containing an input buffer, a code sniffer buffer, an emulator working memory area, and at least one computer program that includes a code sniffer function and an emulator function;

(b) said input buffer receiving input data from said communications port and sending at least one portion of said input data to said code sniffer buffer, (c) scanning, at the beginning of a print job, said portion of incoming data in the code sniffer buffer to determine the type of emulator that corresponds to said print job input data, and to determine if a predetermined data pattern has been received in a print job;

(d) if at least one predetermined data pattern is found, said code sniffer function temporarily ceasing to pass any further data to said emulator working area until said emulator function determines whether said predetermined data pattern comprises a predetermined special token; and (e) if said predetermined special token has been received, said code sniffer function changing a mode of operation so that it will treat all further incoming data for this print job as RAW binary data.

21. The method as recited in claim 20, wherein: if said emulator type is PostScript, then said emulator function determines whether said special token is within a PostScript comment, and if so, said code sniffer function concludes that said predetermined special token has been found and changes said mode of operation by setting the mode flag.

22. The method as recited in claim 20, further comprising: after the mode flag is set, said code sniffer function stops filtering control characters in the input data, and disables any change of emulator commands in the input data.

23. The method as recited in claim 20, further comprising: after the mode flag is set, said code sniffer function treats all of the input data as RAW binary data, except for a Universal Exit Language character string.

* * * * *